United States Patent Office 2,946,807
Patented July 26, 1960

2,946,807
11-OXYGENATED-1-DEHYDROTESTOLOLACTONES

Josef Fried, New Brunswick, and Richard W. Thoma, Somerville, N.J., assignors to Olin Mathieson Chemical Corporation, New York, N.Y., a corporation of Virginia No Drawing. Filed Oct. 27, 1955, Ser. No. 543,243

3 Claims. (Cl. 260—343.2)

This invention relates to, and has for its object, the provision of steroids of the general formula

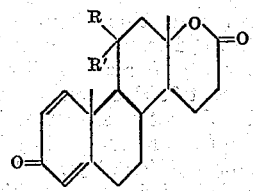

wherein R is hydrogen, R' is α-hydroxy or acyloxy, and together R and R' is keto. These compounds are pharmacologically-active steroids, useful as protein-anabolic and estrogenic agents. Hence the new steroids of this invention can be used in lieu of known protein-anabolic and estrogenic steroids, and may be administered either perorally or parenterally in the treatment of menopausal disturbances being formulated for such administration in the same type of preparations as estradiol, for example, with concentration and/or dosage based on the activity of the particular compound.

It has further been found that one of the steroids of this invention, namely, 11α-hydroxy-1-dehydrotestololactone (R is hydrogen, R' is α-hydroxy) can be prepared from progesterone by subjecting the latter to the action of enzymes of Fusarium javanicum var. ensiforme QM524 (Quartermaster Culture Collection) or to the action of the organism itself under oxidizing and preferably aerobic conditions; and further, that this new steroid can either be oxidized to another of the steroids of this invention, namely, 11-keto-1-dehydrotestololactone, or esterified to yield the 11α-acyloxy derivatives.

Among the steroids formed by the process of this invention are 11α-hydroxy-1-dehydrotestololactone, 11-keto-1-dehydrotestololactone (R and R' is keto), and esters of 11α-hydroxy-1-dehydrotestololactone. Although all ester derivatives have the estrogenic activity of free 11α-hydroxy-1-dehydrotestololactone, the preferred esters are those formed from organic carboxylic acids, especially from organic hydrocarbon carboxylic acids having less than ten carbon atoms, as exemplified by the lower alkanoic acids (e.g. acetic, propionic and butyric acid), the monocyclic aromatic carboxylic acids (e.g. benzoic, toluic, and xyloic acid), and the monocyclic aralkanoic acids (e.g. α-toluic and phenylacetic acid).

To prepare the steroids of this invention, progesterone is subjected to the action of enzymes of the microorganism Fusarium javanicum var. ensiforme under oxidizing conditions. This oxidation can best be effected by either including progesterone in an aerobic culture of the microorganism or by bringing together, in an aqueous medium, the steroid, air, and enzymes of non-proliferating cells of the microorganism.

In general, the conditions of culturing Fusarium javanicum var. ensiforme for the purposes of this invention are (except for the inclusion of the progesterone to be converted) the same as those of culturing various other molds for the production of antibiotics and/or vitamin B-12, i.e., the microorganism is aerobically grown in contact with (in or on) a suitable fermentation medium. A suitable medium essentially comprises a source of carbon and energy. The latter may be a carbohydrate (such as sucrose, molasses, glucose, maltose, starch, or dextrin), a fatty acid, a fat and/or the steroid itself. Preferably, however, the medium includes an assimilable source of carbon and energy in addition to the steroid. Among the fats utilizable for the purpose of this invention are: lard oil, soybean oil, linseed oil, cottonseed oil, peanut oil, coconut oil, corn oil, caster oil, sesame oil, crude palm oil, fancy mutton tallow, sperm oil, olive oil, tristearin, tripalmitin, triolein, and trilaurin. Among the fatty acids utilizable for the purpose of this invention are: stearic acid, palmitic acid, oleic acid, linoleic acid, and myristic acid.

The source of nitrogenous factors may be organic (e.g. soybean meal, corn steep liquor, meat extract and/or distillers solubles) or synthetic (i.e. composed of simple, synthesizable organic and inorganic compounds such as ammonium salts, alkali nitrates, amino acids or urea).

An adequate sterile-air supply should be maintained during fermentation, for example, by the conventional methods of exposing a large surface of the medium to air or by utilizing submerged aerated culture. The steroid may be added to the cultured uring the incubation period, or included in the medium prior to sterilization or inoculation. The preferred (but not limiting) range of concentration of the steroid in the culture is about 0.01 to 0.10%. The culture period (or rather the time of subjecting the steroid to the action of the enzyme) may vary considerably, the range of about 6 to 96 hours being feasible, but not limiting.

The process yields, inter alia, 11α-hydroxy-1-dehydrotestololactone, which may be separated from the broth by extraction. 11α-hydroxy-1-dehydrotestololactone can, if desired, either be esterified in the usual manner, as by treatment with the desired acid anhydride or acyl halide in an organic solvent (preferably an organic base such as pyridine) to yield 11α-acyloxy-1-dehydrotestololactone, or oxidized in the usual manner, as by treatment with a hexavalent chromium compound (e.g. chromic acid) in an organic solvent (preferably an organic acid such as glacial acid) to give 11-keto-1-dehydrotestololactone.

The following examples are illustrative of the invention:

EXAMPLE 1

11α-hydroxy-1-dehydrotestololactone (a) Fermentation.—A fermentation medium of the following composition is prepared:

| | G. |
|---|---|
| Starch | 20 |
| Malted cereal extract syrup | 10 |
| Peptone | 20 |
| Cerelose | 44 |
| $NaNO_3$ | 3 |
| $KH_2PO_4$ | 1 |
| KCl | 0.5 |
| $MgSO_4 \cdot 7H_2O$ | 0.5 |
| $ReSO_4 \cdot 7H_2O$ | 0.0183 |

Water, to make 1 liter.

The pH of the medium is adjusted to 7.0±0.1 with 2 N NaOH solution, and 50 ml. portions of the medium are distributed in 250 ml. Erlenmeyer flasks, and the flasks are plugged with cotton and sterilized by autoclaving for 30 minutes at 120° C. When cool, each of the flasks is inoculated with about one-fifth of the surface growth from a *Fusarium javanicum* var. *ensiforme* agar slant (obtainable, inter alia, from the Quartermaster Culture Collection, Quartermaster General Laboratories, Philadelphia, Pensylvania). The growth is obtained by growing the microorganism on Sabouraud dextrose agar (dextrose, 40 g.; neopeptone, 10 g.; agar, 15 g.; distilled water to make 1000 cc.) for 3 to 30 days.

The flasks are then mechanically shaken for 69 hours at 25° C. on a 280 cycle per minute rotary shaker, after which about 10% (v./v.) is transferred to each of 15 flasks containing the following medium:

| | G. |
|---|---|
| Glucose | 20 |
| Starch | 20 |
| Peptone | 10 |
| $NaNO_3$ | 3 |
| $KH_2PO_4$ | 1 |
| KCl | 0.5 |
| $MgSO_4.7H_2O$ | 0.5 |
| $FeSO_4.7H_2O$ | 0.01 |
| Water, to make one liter. | | and 0.05% of progesterone (total 375 mg.). After 72 hours of incubation, the flasks are harvested and the contents filtered through a Seitz clarifying pad and washed with three 50 ml. portions of water. The total volume of filtrate and wash is 750 ml.

(b) *Isolation of 1-dehydrotestololactone.*—The thus-obtained culture filtrate is extracted with three 800 ml. portions of chloroform and the combined chloroform extracts evaporated to dryness in vacuo. The residue from the chloroform solution (about 353 mg.) is dissolved in 2 ml. of chloroform and 10 ml. of benzene and chromatographed on 6 g. of silicagel. Elution with chloroform-benzene 2:5 (700 ml.) and 1:1 (150 ml.) produces 1-dehydrotestololactone, M.P. about 220–222° C.; $[\alpha]_D^{23}$ —47° ($CHCl_3$) identical in its infrared spectra with an authentic sample.

(c) *Isolation of the 11α - hydroxy - 1-dehydrotestololactone.*—Continued elution of the silicagel with 5% acetone in chloroform (950 ml.) and 25% acetone in chloroform (200 ml.) furnishes 11α-hydroxy-1-dehydrotestololactone, which after crystallization from acetone has the following properties: M.P. about 251–253° C; $[\alpha]_D^{23}$ —58° (c., 0.95 in $CHCl_3$);

$\lambda_{max}^{alc.}$ 244 m$\mu$ ($\epsilon$=18,300); $\lambda_{max}^{Nujol}$ 2.96$\mu$ (OH), 5.80$\mu$ (lactone) 6.03$\mu$, 618$\mu$, 6.26$\mu$ ($\Delta^{1,4}$-keto).

*Analysis.*—Calcd. for $C_{19}H_{24}O_4$ (316.38): C, 72.12; H, 7.65. Found: C, 72.42; H, 7.90.

EXAMPLE 2

(a) *Fermentation.*—250 ml. flasks containing the first medium described in Example 1, section a, are inoculated with a growth of *Fusarium javanicum* var. *ensiforme*, prepared as in Example 1. The flasks are incubated as in Example 1 for 69 hours, after which about 4% (v./v.) transfer is made to each of 60 flasks containing the following medium:

| | G. |
|---|---|
| Glucose | 20 |
| Starch | 20 |
| Peptone | 10 |
| $NaNO_3$ | 3 |
| $KH_2PO_4$ | 1 |
| KCl | 0.5 |
| $MgSO_4.7H_2O$ | 0.5 |
| $FeSO_4.7H_2O$ | 0.01 |
| Water, to make one liter. | | and 0.05% of progesterone (total 1.5 g.). After 96 hours the contents of the flasks are filtered through a Seitz pad and washed with 200 ml. of water. Total volume of filtrate and wash is 1783 ml.

(b) *Isolation of 1 - dehydrotestololactone and $\Delta^{1,4}$-androstadiene-11α-ol-3,17-dione.*—The thus-obtained culture filtrate is extracted with three 1500 ml. portions of chloroform and the combined chloroform extracts evaporated to dryness in vacuo. The residue from the chloroform extract (1.1076 g.) is dissolved in 5 ml. of chloroform and 25 ml. of benzene and chromatographed on 22 g. of silicagel. Elution with chloroform-benzene 1:1 (900 ml.) and with chloroform (225 ml.) yields 1-dehydrotestololactone (about 470 mg.), which is followed by $\Delta^{1,4}$-androstadiene-11α-ol-3,17-dione (about 197 mg.) when the eluant is changed to 5% acetone in chloroform (2100 ml.). The latter is identified by comparison with an authentic sample and by oxidation to $\Delta^{1,4}$-androstadiene-3,11,17-trione.

(c) *Isolation of the 11α - hydroxy - 1-dehydrotestololactone and $\Delta^{1,4}$-androstadiene-11α,17β-diol-3-one.*—Continued elution with acetone-chloroform (1:4) (950 ml.) and 1:1 (200 ml.) furnishes a crystalline fraction (about 170 mg.) which melts at about 165–167° C. and which on crystallization behaves like a mixture. It is, therefore, dissolved in 1 ml. of chloroform and 1.5 ml. of benzene and rechromagraphed on 2.2 g. of sulfuric acid-washed alumina. Elution with chloroform-benzene 2:3 (300 ml.) furnishes 11α-hydroxy - 1 - dehydrotestololactone (about 10 mg.) which after recrystallization from ethyl acetate melts at about 250° C. and whose infrared spectrum is identical with that of an authentic sample. Subsequent elution with chloroform (300 ml.) and with 5% acetone in chloroform (100 ml.) yields $\Delta^{1,4}$-androstadiene-11α,17β-ol-3-one, identified by its melting point (about 183–185° C.) and by infrared comparison with an authentic sample.

11α-hydroxy-1-dehydrotestololactone can be oxidized to the 11-keto derivative as illustrated in the following example:

EXAMPLE 3

*11-keto-1-dehydrotestololactone*

To a solution of 22.5 mg. of 11α-hydroxy-1-dehydrotestololactone in 2 ml. of glacial acetic acid is added a solution of 10 mg. of chromic acid in 2 ml. of acetic acid. After 30 minutes at room temperature, methanol is added to reduce excess chromic acid and the mixture is taken up in water and chloroform. The chloroform solution is extracted with water, dilute sodium bicarbonate and again with water, dried over sodium sulfate and the solvent removed in vacuo. The residue from the chloroform extract is crystallized from acetone-hexane yielding the pure ketone of the following properties: M.P. about 213–215° C.; $[\alpha]_D^{23}$ +54° (c., 0.70 in $CHCl_3$);

$\lambda_{max}^{alc.}$ 239 m$\mu$ ($\epsilon$=16,100); $\lambda_{max}^{Nujol}$ 5.75$\mu$ (lactone); 5.83$\mu$ (11-keto); 6.00$\mu$, 6.14$\mu$, 6.23$\mu$ ($\Delta^{1,4}$-3-keto).

*Analysis.*—Calcd. for $C_{19}H_{22}O_4$ (314.36): C, 72.59; H, 7.05. Found: C, 72.78; H, 7.04.

11α-hydroxy-1-dehydrotestololactone can be acylated as illustrated by the following example:

EXAMPLE 4

*11α-hydroxy-1-dehydrotestololactone 11α-acetate*

A solution of 25 mg. of 11α-hydroxy-1-dehydrotestololactone in 0.5 ml. of pyridine and 0.5 ml. of acetic anhydride is allowed to stand at room temperature for 18 hours. After removal of the reagents in vacuo, the crystalline residue is recrystallized from acetone-hexane to yield the pure acetate of 11α-hydroxy-1-dehydrotestololactone.

Similarly, by substituting other acid anhydrides, such as propionic anhydride, or acyl halides, such as benzoyl chloride, for the acetic anhydride in the procedure of Example 4, the corresponding ester derivatives are produced.

The invention may be variously otherwise embodied within the scope of the appended claims.

We claim:
1. A steroid of the general formula

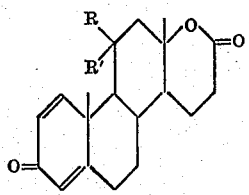

wherein R is hydrogen, R' is selected from the group consisting of α-hydroxy and α-acyloxy, wherein the acyl radical is of an organic hydrocarbon carboxylic acid of less than ten carbon atoms selected from the group consisting of lower alkanoic acids, monocyclic aromatic carboxylic acids and monocyclic aralkanoic acids, and together R and R' is keto.

2. 11α-hydroxy-1-dehydrotestololactone.
3. 11-keto-1-dehydrotestololactone.

References Cited in the file of this patent

UNITED STATES PATENTS

| | | |
|---|---|---|
| 2,744,120 | Fried et al. | May 1, 1956 |
| 2,755,289 | Picha | July 17, 1956 |

OTHER REFERENCES

Fried et al.: Journ. Am. Chem. Society, vol. 75, pp. 5764–5 (1953).

Vischer et al.: Experentia, vol. 9, #10, pp. 371–372 (1953).

Peterson et al.: J.A.C.S., 75, 5768–5769 (November 1953).